United States Patent Office 3,203,833
Patented Aug. 31, 1965

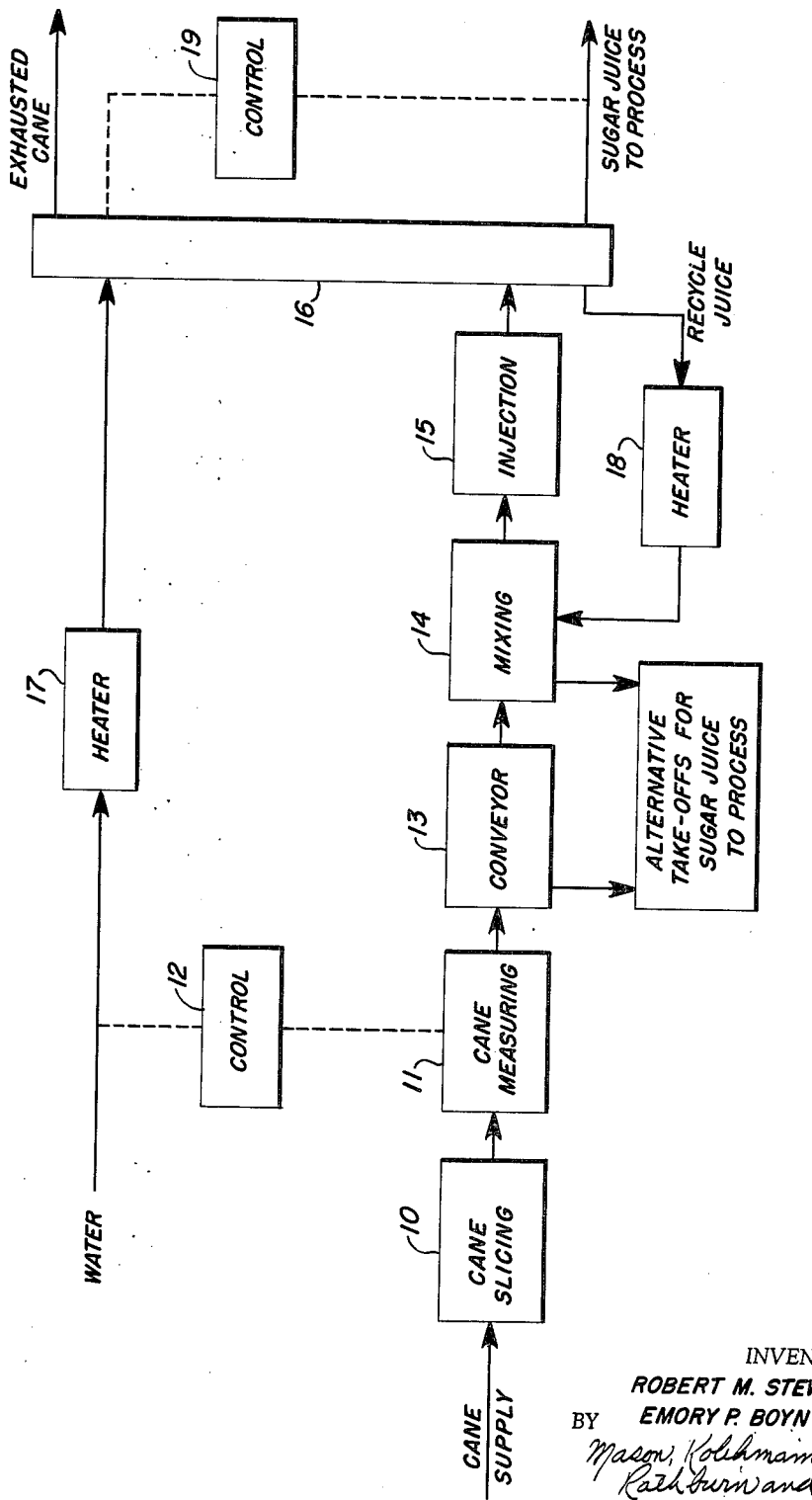

3,203,833
CONTINUOUS DIFFUSION PROCESS
Robert Marshall Stewart, New Orleans, La., and Emory P. Boynton, Chicago, Ill., assignors to Chemetron Corporation, Chicago, Ill., a corporation of Delaware
Continuation of application Ser. No. 723,843, Mar. 25, 1958. This application Aug. 18, 1959, Ser. No. 834,472
10 Claims. (Cl. 127—45)

This application is a continuation of our copending application Serial No. 723,843, filed March 25, 1958, now abandoned, which is a continuation-in-part of our prior application Serial No. 484,332, filed January 27, 1955, now abandoned.

This invention relates to a radically improved method for extracting sugar (sucrose) from sugar cane and more specifically it relates to a continuous diffusion process for removing the sugar bearing juice from sugar cane by means of a countercurrent method whereby a cane juice of increased purity is obtained which gives a correspondingly increased overall yield of sucrose in the commercial crystalline product.

For over a century the method of expressing the sugar bearing juice from sugar cane has comprised passing sugar cane stalks through a series of crushing and squeezing type rollers to force the juice from the fiber and other parts of the plant. It has been the practice to employ several series of rollers in tandem, and before the sugar cane passes through the last set of rollers, hot or cold water is added to assist in washing the sugar out of the crushed cane fiber. As a result of this crushing and pressing action, substantial amounts of undesirable materials are expressed from the cane, along with the juice, and these remain in the juice as undesirable impurities. These impurities interfere with the maximum production of commercial crystalline sugar from the juice, with the result that a significant amount of the sugar is lost in less valuable byproducts, such as final molasses (blackstrap). The present invention avoids the crushing and pressing of the cane and therefore provides a juice of a higher quality which yields a greater percentage of commercial crystalline sugar than is presently obtainable by conventional methods.

Also, in the past, attempts have been made to approach a more complex extraction of the sugar by washing crushed, shredded or otherwise disintegrated sugar cane in various ways such as by spraying water on it or by submerging the cane in a water bath provided between a series of crushing-squeezing units. These techniques are known in the industry as maceration or imbibition. Even though a marginal improvement in overally extraction of the sucrose or the sugar bearing juices has been accomplished in these ways, a correspondingly larger amount of undesirable impurities is concomitantly obtained. Notwithstanding the large amount of impurities that result, certain of these techniques and various combinations of them are still practiced in areas of the world where economic features tend partially to offset the undesirable aspects of such special expedients, all of which are associated with the ancient practice of crushing the juice from the cane.

In the conventional milling process, the percentage of sucrose removed from cane averages 91% to 92% of that available, rarely exceeds 92% to 93%, and sometimes drops to 88% or lower. In comparison, the method of the present invention will remove at least 98% of the sucrose available in cane and the total sucrose extraction can be increased to greater than 99%. Mixed juice from conventional milling (that is, crusher juice plus meceration liquor) generally averages from about 80% to 85% purity, compared to purities of from 83% to 88% consistently attained by the practice of the present invention.

The conventional sugar cane crushing and squeezing equipment is composed of heavy machinery which makes such units expensive, requiring extensive power to drive them and considerable manpower to operate them. Furthermore, a shelter building of substantial size is required, involving considerable floor space, because the material in process through the mill train would be otherwise exposed to the weather. The process of the present invention can be conducted with relatively lightweight equipment weighing less than one-half as much as the present conventional equipment of equal capacity, and proportionately less in ultimate cost. The power consumption and manpower requirements are only about one-half to one-quarter of those necessary for conventional milling procedures. No building is required because the entire operation is totally enclosed, and only about one-quarter of the amount of floor space or area is utilized by the equipment used in operating the process of the present invention. Therefore, the present invention entails substantially lower capital investment as well as radically lower labor and power operating costs.

The object of this invention is to provide a new method for removing the sugar bearing juice from sugar cane in increased quantities, and having a higher overall purity than that resulting from conventional milling methods.

A further object of this invention is to provide a method of extracting the sugar (sucrose) from sugar cane by a process whereby sugar is removed from the cells of the sugar cane by continuous diffusion, with a minimum of contamination by impurities and unavoidable fermentation as encountered in conventional milling practice.

A still further object is to provide a method for easily extracting 98% or more of the available sucrose from the sugar cane by a continuous diffusion technique.

Still another object is the method of obtaining a sugar bearing juice of increased purity from the cane which will give a higher yield of crystalline sugar than is now obtainable from juices extracted by conventional milling procedures as usually practiced in the industry.

Other objects and purposes of this invention will be apparent from the following disclosure.

While continuous diffusion processes have been proposed in the past for treating sugar beets, no such continuous operations have been successfully practiced with sugar cane. Sugar beets are more susceptible to diffusion processes because they form a slippery, self-lubricating mass when admixed with water or with low density sugar bearing liquids. It has been found that methods which are operative with sugar beets are not operative with sugar cane, and, until this invention, no feasible operative method for continuously removing the sugar bearing juice from sugar cane by diffusion had been satisfactorily accomplished.

A discussion of the problems to be surmounted in successfully producing sugar bearing juice from sugar cane by diffusion is presented by O. W. Willcox in Sugar, May, 1951, at pages 28–30. Willcox points out that batch methods for the diffusion of sugar cane have been attempted in the past, but no continuous method has been developed. He outlines some of the factors to be considered and the problems to be solved in developing a continuous process for the removal of sugar bearing juice from cane by diffusion. For instance, the dimension characteristics and size of cane fragments, the time of diffusion and the temperature of the diffusing medium must be worked out before a suitable diffusion procedure can be accomplished. This is particularly true because sugar beets and sugar cane are strikingly and inherently different vegetables, both physically and chemically. In the past it has been the practice to comminute or grind the cane to extremely fine particles so as to rupture the greatest possible number of cells and expose the comminuted mass to hot extraction, but, as noted in the foregoing publication, such practice has been unsuccessful. A description of a complicated sugar cane diffuser is given in Sugar, March 1952, at pages 49–51, but the method is completely different from that disclosed herein and the process has never been put into successful commercial operation, nor does the latter appear even to be a likely possibility due to the complexity of the apparatus.

The Langen Patent No. 2,637,666 discloses an extraction apparatus for vegetable materials, particularly sugar beets, but pertains only to shredded vegetables. An article in Sugar, March 1952, pages 49–51, discusses a continuous cane diffusion apparatus but does not describe how the cane is processed. It does reveal that the cane is prepared by a set of revolving knives followed by a set of shredding knives, establishing that the cane is shredded indiscriminately rather than sliced into disks substantially transversely to the axis of the cane, as in the present invention. It is evident that the Sugar article does not describe a working diffusion method.

As a further example of futile attempts in the prior art to extract the sugar from sugar cane, mention might be made of the Michiels Patent No. 4790. Michiels cut cane into very thin slices of maximum thickness of one-tenth inch for the express purpose of opening the vascular vessels so that the sugar might be dissolved or leached out of the cane. His process is not a diffusion method because the cell walls are ruptured. The advantages of diffusion are lost in the Michiels method and the sugar bearing juice must be essentially the same as that produced by crushing and milling the cane.

An important feature of this invention is the fact that the sugar bearing juice is continuously removed from sugar cane by continuous diffusion rather than by crushing or shredding as in prior practice. By this technique the cell walls are not substantially crushed or ruptured. Instead, the sugar bearing juice is essentially removed by diffusion through the intact cell wall which acts as a semipermeable membrane, allowing sugar solution to pass out of the cell and water to pass into the cell to replace the extracted juice. By this method, undesirable materials commonly found in raw cane juice are left in the cells to a considerable degree, thereby achieving an increased purity of the extracted raw sugar juice, which results in significantly increased efficiency of the procedures required for the subsequent processing of cane juice to commercial crystalline cane sugar. For instance, the lower viscosity of the sugar bearing juice, due to its higher purity, allows evaporation to proceed more rapidly and efficiently and provides for a more effective heat transfer in the evaporators. Less final molasses is produced, and more of a higher quality commercial sugar is recovered.

Increased purity of the raw sugar cane juice obtained by the present invention means that this juice has a higher content of sucrose in relation to the total dissolved solids, in that the undesirable materials, such as coloring matter, gums, pentosans, polysaccharides, proteins, and other impurities, are largely left in the cells during the diffusion procedure. Consequently, the purity of the resulting sugar bearing juice is considerably higher than that obtained by conventional pressing-squeezing methods applied to crushed or shredded cane. Sugar (diffusion) juice resulting from this process has a density in the range of 10° to 17° Brix, dependent on the condition and maturity of the cane being processed and the relative quantity of water required as the extracting medium. By repeated tests, it has been established that the purity of the juice extracted by this continuous diffusion process is from two to three percentage points higher in purity than that obtained from the same cane by conventional milling practice. It has also been proven that the total amount of the sugar bearing juice extracted by our continuous diffusion process is well in excess, by some 5% to 12%, of that now normally obtainable by conventional milling methods. The foregoing aspects represent considerable attractive economic advantages in favor of the process of this invention in comparison with present milling practices.

The method which constitutes this invention can best be understood by reference to the attached drawing, which has a single figure comprising a flow sheet that illustrates the various steps involved.

Referring to the drawing, which in diagram shows the entire process, sugar cane as it comes from the field is supplied to a cane slicing means 10 which cuts or chops the stalks of cane transversely into uniform slices. The amount of the cane slices is determined by a suitable device 11 and the input of heated water to the final diffusion stage 16 is correlated thereto by a control mechanism 12. The cane slices are transported via a conveyor 13 to a heating and suspension-forming station and preliminary diffusor 14 where a suspension is formed of the slices of cane with hot sugar juice, by thoroughly mixing the pieces of cane with hot juice, as, for example, by agitation. This hot sugar juice will have a density of 10° to 17° Brix and a temperature of 150° F. (65° C.) or more. Immediately upon contact of the cane slices with hot juice, diffusion commences and continues throughout the process until the cane slices are removed from the final diffusion stage. This suspension formed at station 14 is injected at 15, by suitable means which may be a pump or the like, to the final diffusion stage 16. The final diffusion 16 may be any apparatus capable of continuously transporting a suspension of cane slices countercurrent to a diffusion medium. The suspension of cane slices is introduced at one end of the final stage diffusor and removed from the other end as exhausted cane. The mechanical structure of the diffusor will, of course, affect the overall efficiency at this stage of the process, and, therefore, is a matter of careful selection. The exhausted cane is removed as waste, which is no longer of any concern to this process. The waste can be further processed for use as fuel or for recovery of the fiber or juice content thereof.

Input (draft) water is passed through a heater 17 where its temperature is raised to at least 150° F. (65° C.). The flow of water is adjusted by the control device 12 which is regulated by the measuring device 11 so that the input of hot water is correlated to the input of sugar cane pieces and the rate of withdrawal of sugar juice for processing. The heated water passes through the final stage diffusor 16 countercurrently to the cane pieces. As the heated water moves countercurrent to the suspended cane slices it successively extracts sugar from the cane slices by diffusion, the sugar bearing juice in the cane being substantially replaced by water. The resulting sugar solution or diffusion juice gravitates to the lower regions of the final diffusion stage 16 from which a portion is recycled through a recycle heater 18 to the mixing station 14 and thence is returned with newly suspended cane slices to the final diffusor 16. The remainder of the juice is withdrawn continuously for processing to recover the sugar contained therein. This subsequent processing may be carried out by any usual or conventional method, requiring no modification or only that due to the higher purity of the juice. The amount of juice withdrawn is regulated by a liquid controller 19 which adjusts the flow of juice so that the appropriate quantity of liquid is maintained in the final stage diffusor 16 to insure substantially complete diffusion of the cane slices. If desired, the juice may be drawn off to process from the station 14 under the same controlled conditions set forth above, or as a still further alternative, from the conveyor 13, as described below.

From the point where they leave the cutter 10 and are conveyed to the suspension station 14, and throughout the injection operation 15 and the final diffusion stage 16, the cane slices are in the form of a slurry or suspension of discrete generally uniform slices of cane in sugar juice or water. The proportions of cane slices and liquid in this mixture are so regulated at all times prior to discharge of the exhausted cane from the diffusor that the suspension can be pumped or otherwise conveyed. When the cane slices are of the dimensions given herein, this usually involves from one to three parts or volumes of water or sugar juice for each part or volume of cane slices, and it is generally preferable to keep the proportion of cane slices in the mixture as large as possible. The diffusion process begins as soon as cane pieces come in contact with hot sugar juice, and it continues throughout the mixing operation and during the transfer from the mixing station to the final diffusion stage by way of the injection means.

In one modification of the procedure the slices of cane, after they are weighed or measured, are transferred to a suspension tank 14 by a scroll conveyor 13 through which is passed a countercurrent stream of hot sugar juice from the lower end of the final diffusor 16 or from the suspension tank 14. This hot juice becomes enriched in sugar by diffusion, resulting in higher concentration of sugar than would ordinarily be obtained. The juice from the conveyor 13 is led away for processing since it is at its maximum sugar concentration and therefore in the most desirable form for sugar recovery. The heat content of this juice is partially utilized in heating the incoming sugar cane slices before they enter the suspension station, adding to the economy of the process. The slices of cane therefore undergo a certain amount of diffusion before they reach the suspension station. Diffusion which takes place before the pieces of cane reach the final diffusion stage may be termed preliminary diffusion and is an integral part of the entire process.

Regardless of whether the sugar juice for processing is drawn off from the conveyor 13, from the suspension station 14, or from the final diffusion stage 16, the flow control apparatus 19 is connected to the juice outlet in order to assure that the proper amount of liquid is maintained in the final diffusion stage.

For optimum operation of the process, it is desirable that the sugar cane be in the form of disks or slices of sugar cane having a diameter essentially equal to that of the diameter of the sugar cane stalk. For practical purposes thicknesses of less than about ½ inch (13 millimeters) are required. Preferably sugar cane disks ⅛ inch (3 millimeters) to ⅜ inch (9 millimeters) in thickness are used. The slices into which the cane is cut or divided are essentially disk-shaped because the cutting is done substantially transversely to the axis of the stalk. However, all slices are not uniform disks in that some may be broken in handling and some stalks may not be sliced precisely transversely but obliquely, resulting in cane slices which are oval in shape. The diameter of the cane slices may vary from about one-half inch (13 millimeters) for some cane to over two inches (50 millimeters) for larger stalks. The important factor is not so much the shape or configuration of the pieces of sugar cane, but the range of dimensions substantially parallel to the stalk axis is critical. It is necessary that the slices be not too thick, otherwise they resist both diffusion and transfer in suspension in water or sugar juice, and not too finely divided, otherwise the purity of the resulting diffusion juice is adversely affected and the material may pack into an immovable mass.

The temperature of the liquids in the diffusion apparatus is maintained between 150° F. (65° C.) and the boiling point of the fluid. Below 150° F. (65° C.) diffusion of the sugar from the sugar cane is impractical. At temperatures above the boiling point of the sugar can juice used for preparing the slurry, the membranes of the sugar cane cells may be ruptured with the result that excessive quantities of materials other than sucrose are extracted from the cane. Preferably a temperature in the range of 180° F. (82° C.) to 200° F. (93° C.) is maintained. The temperature in the final diffusion stage is easily maintained within narrow limits if the temperature of the input water and input suspension are controlled within the limits stated. The final diffusor should be adequately insulated with conventional insulating material such as magnesia, asbestos or other appropriate covering material, and the temperature need not vary more than two or three degrees Fahrenheit (one to two degrees centigrade) throughout the process. If necessary, however, additional heat may be supplied to the final diffusor by steam lines or similar devices (not shown) to maintain the temperature of fluid in the final diffusion stage within the desired range, and to provide for rapid heating of the materials following a shutdown.

In order to remove essentially all of the sugar from the cane it has been found that the slices should be in contact with the countercurrent stream of fluid for a period of at least fifteen minutes and preferably from twenty to forty-five minutes. Contact times above forty-five minutes are economically undesirable. Therefore, the final stage diffusor should be arranged so that the cane suspension moves at such a speed as will insure that the average time of contact of the cane slices with the extracting fluid will be at least about twenty minutes but no longer than forty-five minutes. This can be arranged by controlling the dimensions of the final diffusor, the speed at which the suspension is transported, or the rate of input of suspended slices of cane.

The exhausted cane slices discharged from the final diffusion stage may be pressed and the press water obtained therefrom will contain a small amount of sugar. This material may be fed back into the final diffusion stage at a point where the concentration of sugar in the final diffusion stage liquid is about the same as that of the press water. By this means, a higher overall extraction of sugar can be obtained, but the purity of the resulting juice will be reduced slightly because of the return of impurities which are pressed out of the exhausted slices. As a result, in actual practice, it is seldom desirable to introduce press water to the process, although this may be advantageous in certain circumstances.

Chemicals, such as lime, sulfur dioxide or phosphates, and clarifying or defecating agents can be introduced into the process at appropriate places as indicated or required by the type of sugar cane used, without departing from the present invention. Preserving agents such as formaldehyde can be added to the fluids in the event that such agents should ever be required.

As an example of the method of this invention, and to compare the method to conventional milling procedures, the following operations were carried out. Freshly harvested sugar cane grown in southern United States was cut into disks having a thickness of one-eighth inch (3 millimeters) to three-eighths inch (9 millimeters). The cane disks were suspended in about two parts of hot sugar juice having a density of 12° Brix and a temperature between 180° F. (82° C.) and 200° F. (93° C.) and the suspension pumped into a final diffusor in the form of a tower, as described in the copending application of Robert Marshall Stewart and Wallace P. Sevin, Serial No. 568,741, filed March 1, 1956 (now Patent No. 2,950,998, August 30, 1960), having a diameter of three feet (0.914 meter) and a height of 38 feet (12.5 meters) provided with a coaxial rotating helical scroll divided into 36 groups of 90° sectors. The inside of the tower was equipped with 144 deflectors arranged in groups of four at levels such that the deflectors protruded through spaces in the helical scroll to within a short distance from the axle of the scroll. The helical scroll was attached to the axle in groups of two flights or sectors of two helices per level, with spaces between each level to accommodate the deflectors. Water at a temperature above 180° F. (82° C.) was introduced at the top of the tower at a rate equal to about 115% of the input of sugar cane disks. Sugar juice was collected at the bottom of the tower. Part of the juice was reheated to 180° F. (82° C.), recycled with sugar cane disks and injected near the bottom of the tower. The excess juice was drawn off for processing at a rate correlated with the input of hot water to maintain the liquid in the tower at a predetermined level. The sugar juice thus withdrawn had a density of 12° Brix, and an average purity of 87.5% and contained 97.6% of the total sucrose available in the cane.

In a parallel operation carried out at the same time with freshly harvested cane of the same quality from the same fields, a commercial sugar mill using conventional equipment produced sugar juice for processing having a density of 14° Brix, and an average purity of 85% and contained 92% of the total sucrose available in the cane that was milled.

It is evident from the comparative values given above that the present invention is vastly superior to the conventional milling process. While this particular operation of the process produced juice of less density, this value can be readily raised by adjustment of conditions within the limits discussed above to, equal to or greater than, that obtained by the conventional method, while retaining other advantages. For instance, withdrawing juice from the cane conveyor instead of from the bottom of the tower gives higher density.

In the example just given and throughout the specification, reference has been made to the presently preferred embodiments for the practice of this invention. It will be understood that various modifications within the scope of the invention as defined are possible and it is intended that such modifications and variations be included within the invention as described herein and defined by the appended claims.

What is claimed as new and is desired to be secured by Letters Patent of the United States is:

1. A method of extracting sugar cane juice from sugar cane by continuous diffusion which comprises cutting sugar cane into slices having a dimension substantially parallel to the fiber axis of the cane stalk not greater than one-half inch (13 millimeters) and not less than one-eighth inch (3 millimeters), forming a suspension of said cane pieces with hot sugar cane juice having a density of 10° to 17° Brix, introducing said suspension into an inlet of a countercurrent diffusion apparatus, transporting said cane pieces countercurrent to a stream of hot water, removing exhausted cane pieces from an outlet of the diffusion apparatus, collecting cane sugar juice near the said inlet of the diffusion apparatus, recycling a part of said juice to form the suspension of cane pieces and drawing off the excess of the collected cane sugar juice.

2. The method of claim 1 wherein the pieces of sugar cane have a diameter not substantially greater than the diameter of the cane stalk.

3. The method of claim 2 wherein the sugar cane juice is drawn off at a rate substantially equal to that of the stream of hot water introduced.

4. The method of claim 3 wherein the temperature of the hot sugar cane juice and the hot water is at least about 160° F.

5. The method of claim 4 wherein the sugar cane is cut substantially transversely to the axis of the stalk into pieces having a thickness of at least one-eighth inch (3 millimeters) and not greater than three-eighths inch (9 millimeters) and a diameter not substantially greater than the diameter of the cane stalk.

6. The method of claim 5 wherein the cane pieces are transported continuously in the diffusion apparatus countercurrent to a stream of hot water at a speed such that the average time to traverse the diffusion apparatus is at least approximately 20 minutes.

7. The method of claim 6 wherein the suspension of cane pieces in hot sugar cane juice consists of about one part of cane pieces with about two parts of hot sugar cane juice.

8. A method of extracting sugar cane juice from sugar cane by continuous diffusion which comprises cutting sugar cane into slices having a dimension substantially parallel to the fiber axis of the cane stalk not greater than one-half inch (13 millimeters) and not less than one-eighth inch (3 millimeters), introducing said cane pieces simultaneously with hot sugar cane juice having a density of 10° to 17° Brix into a preliminary diffusor, agitating the cane pieces in the juice to form a suspension in the preliminary diffusor, transporting the suspension of cane pieces from the preliminary diffusor and introducing said suspension into a final countercurrent diffusion apparatus, transporting said cane pieces countercurrent to a stream of hot water, removing exhausted cane pieces from the final diffusion apparatus, and collecting cane sugar juice near the said inlet of the final diffusion apparatus.

9. A method of extracting sugar cane juice from sugar cane by continuous diffusion which comprises cutting sugar cane into slices having a dimension substantially parallel to the fiber axis of the cane stalk not greater than one-half inch (13 millimeters) and not less than one-eighth inch (3 millimeters), introducing said cane pieces simultaneously with hot sugar cane juice having a density of 10° to 17° Brix into a preliminary diffusor, agitating the cane pieces in the juice to form a suspension in the preliminary diffusor, transporting the suspension of cane pieces from the preliminary diffusor and introducing said suspension into a final countercurrent diffusion apparatus, transporting said cane pieces countercurrent to a stream of hot water, removing exhausted cane pieces from the final diffusion apparatus, collecting cane sugar juice from the lower region of the preliminary diffusor, recycling a part of said collected juice to form the suspension of cane pieces and drawing off the excess of the collected cane sugar juice.

10. A method of extracting sugar cane juice from sugar cane by continuous diffusion which comprises cutting sugar cane into slices having a dimension substantially parallel to the fiber axis of the cane stalk not greater than one-half inch (13 millimeters) and not less than one-eighth inch (3 millimeters), introducing said cane pieces simultaneously with hot sugar cane juice having a density of 10° to 17° Brix into a preliminary diffusor, agitating the cane pieces in the juice to form a suspension in the preliminary diffusor, transporting the suspension of cane pieces from the preliminary diffusor and introducing said suspension into a final countercurrent diffusion apparatus, transporting said cane pieces countercurrent to a stream of hot water, removing exhausted cane pieces from the final diffusion apparatus, collecting cane sugar juice from the lower region of the final diffusion apparatus, recycling a part of said collected juice to form the suspension of cane pieces and drawing off the excess of the collected cane sugar juice.

References Cited by the Examiner

UNITED STATES PATENTS

| | | | |
|---|---|---|---|
| 1,551,546 | 3/04 | Rak | 127—7 |
| 2,502,939 | 4/50 | Frynta | 127—5 |
| 2,645,589 | 7/53 | Langen | 127—45 |
| 2,885,311 | 5/58 | Bruniche-Olsen et al. | 127—45 |
| 2,950,998 | 8/60 | Stewart et al. | 127—7 |

FOREIGN PATENTS

| | | |
|---|---|---|
| 410,730 | 9/32 | Great Britain. |
| 498,824 | 2/51 | Belgium. |

OTHER REFERENCES

Willcox "Sugar," May 1931, pp. 28–30.
"Sugar" April 1950, pp. 34–36.
McGinnis: Beet Sugar Tech., pp. 143, 147, 163–166.

MORRIS O. WOLK, *Primary Examiner*.

WILLIAM B. KNIGHT, *Examiner*.